United States Patent
Gregorius et al.

(10) Patent No.: US 7,561,639 B2
(45) Date of Patent: Jul. 14, 2009

(54) METHOD AND DEVICE FOR ESTIMATING CHANNEL PROPERTIES OF A TRANSMISSION CHANNEL

(75) Inventors: Peter Gregorius, Munich (DE); Paul Georg Lindt, Donauwörth (DE); Heinz Mattes, Munich (DE)

(73) Assignee: Infineon Technologies AG, Munich (DE)

( * ) Notice: Subject to any disclaimer, the term of this patent is extended or adjusted under 35 U.S.C. 154(b) by 658 days.

(21) Appl. No.: 10/970,516

(22) Filed: Oct. 21, 2004

(65) Prior Publication Data
US 2005/0111591 A1 May 26, 2005

(30) Foreign Application Priority Data
Oct. 24, 2003 (DE) .................. 103 49 566

(51) Int. Cl.
*H04L 27/06* (2006.01)
(52) U.S. Cl. .................................... 375/340
(58) Field of Classification Search ............ 375/340
See application file for complete search history.

(56) References Cited

U.S. PATENT DOCUMENTS 6,697,633 B1 * 2/2004 Dogan et al. ................ 455/509
2002/0034223 A1 * 3/2002 Doetsch et al. ............. 375/232
2002/0062295 A1 * 5/2002 Enenkel et al. ............... 706/12
2003/0123583 A1 * 7/2003 Yellin et al. ................. 375/349
2004/0028154 A1 * 2/2004 Yellin et al. ................. 375/341
2004/0156443 A1 * 8/2004 Dent .......................... 375/267

FOREIGN PATENT DOCUMENTS

GB   2 279 777   1/1995

OTHER PUBLICATIONS

Julie K. Petersen, "The Telecommunications Illustrated Dictionary," 2nd Edition, CRC Press LLC, 2002, p. 182.*

* cited by examiner

*Primary Examiner*—David C Payne
*Assistant Examiner*—Nader Bolourchi
(74) *Attorney, Agent, or Firm*—Dicke, Billig & Czaja, PLLC

(57) ABSTRACT

To estimate physical properties of a wired or wireless transmission channel it is proposed to sample a signal, received via the transmission channel, for example a system response of the corresponding transmission system, in order, on the basis of the sampled values thus obtained, to ascertain the moments of the order 0 . . . n of the received signal. Using these moments of the order 0 . . . n, n parameters of a transmission function of the transmission channel can be determined, wherein the parameters can be polynomial coefficients, zero points or coefficients of a residual notation of the transmission function. Using this transmission function the physical properties of the transmission channel, such as the attenuation and dispersion properties, can be determined exactly or at least approximately assessed.

20 Claims, 2 Drawing Sheets

FIG 3

$$H(p) = \frac{a_0 + a_1 p + a_2 p^2 + a_3 p^3 + \ldots + a_n p^n}{b_0 + b_1 p + b_2 p^2 + b_3 p^3 + \ldots + b_n p^n}$$

$$\begin{pmatrix} b_1 \\ b_2 \\ \vdots \\ b_{n-2} \\ b_{n-1} \\ b_n \end{pmatrix} = - \begin{pmatrix} \tilde{m}_n & \tilde{m}_{n-1} & \cdots & \tilde{m}_3 & \tilde{m}_2 & \tilde{m}_1 \\ \tilde{m}_{n+1} & \tilde{m}_n & \cdots & \tilde{m}_4 & \tilde{m}_3 & \tilde{m}_2 \\ \tilde{m}_{n+2} & \tilde{m}_{n+1} & \cdots & \tilde{m}_5 & \tilde{m}_4 & \tilde{m}_3 \\ & & & & & \\ \tilde{m}_{2n-3} & \tilde{m}_{2n-4} & \cdots & \tilde{m}_n & \tilde{m}_{n-1} & \tilde{m}_{n-2} \\ \tilde{m}_{2n-2} & \tilde{m}_{2n-3} & \cdots & \tilde{m}_{n+1} & \tilde{m}_n & \tilde{m}_{n-1} \\ \tilde{m}_{2n-1} & \tilde{m}_{2n-2} & \cdots & \tilde{m}_{n+2} & \tilde{m}_{n+1} & \tilde{m}_n \end{pmatrix}^{-1} \begin{pmatrix} \tilde{m}_{n+2} \\ \tilde{m}_{n+2} \\ \tilde{m}_{n+3} \\ \vdots \\ \tilde{m}_{2n-2} \\ \tilde{m}_{2n-1} \\ \tilde{m}_{2n} \end{pmatrix}$$

$$\begin{pmatrix} a_0 \\ a_1 \\ a_2 \\ \vdots \\ a_{n-2} \\ a_{n-1} \\ a_n \end{pmatrix} = \begin{pmatrix} 0 & 0 & \cdots & 0 & 0 & 0 \\ \tilde{m}_0 & 0 & \cdots & 0 & 0 & 0 \\ \tilde{m}_1 & \tilde{m}_0 & \cdots & 0 & 0 & 0 \\ & & & & & \\ \tilde{m}_{n-3} & \tilde{m}_{n-4} & \cdots & \tilde{m}_0 & 0 & 0 \\ \tilde{m}_{n-2} & \tilde{m}_{n-3} & \cdots & \tilde{m}_1 & \tilde{m}_0 & 0 \\ \tilde{m}_{n-1} & \tilde{m}_{n-2} & \cdots & \tilde{m}_2 & \tilde{m}_1 & \tilde{m}_0 \end{pmatrix} \begin{pmatrix} b_1 \\ b_2 \\ \vdots \\ b_{n-2} \\ b_{n-1} \\ b_n \end{pmatrix} + \begin{pmatrix} \tilde{m}_0 \\ \tilde{m}_1 \\ \tilde{m}_2 \\ \vdots \\ \tilde{m}_{n-2} \\ \tilde{m}_{n-1} \\ \tilde{m}_n \end{pmatrix}$$

$$\tilde{m}_i = (-1)^i m_i; \; i = 0, 1 \ldots n; \; n \in \mathbb{N}$$

METHOD AND DEVICE FOR ESTIMATING CHANNEL PROPERTIES OF A TRANSMISSION CHANNEL

CROSS-REFERENCE TO RELATED APPLICATIONS

This Utility Patent Application claims priority to German Patent Application No. DE 103 49 566.5, filed on Oct. 24, 2003, which is incorporated herein by reference.

BACKGROUND

The present invention relates to a method and to a device for estimating channel properties of a transmission channel. Specifically, it may provide compensation of attenuation or dispersion effects, caused by the respective electrical transmission channel, as a function of the assessed channel properties.

When electrical signals are transmitted via a wired or wireless transmission channel, the signals arriving at the respective receiver no longer have the same signal form as at the transmitter as a result of the physical properties of the transmission channel or transmission medium. These signal changes are a consequence of the frequency-dependent attenuation and dispersion characteristics of the transmission path. The signal quality at the receiver also decreases as the length of the transmission channel, for example a copper conductor, increases. If a critical length is exceeded, the received signal can sometimes no longer be correctly detected. A maximum range of the signal transmission is thus defined by the physical properties of the transmission signal, which will hereinafter be called the channel properties.

If the physical channel properties of the transmission channel, such as the attenuation and dispersion characteristics, in particular, are known to some extent, then, as a result of suitable measures on the receiver or transmitter side, the attenuation or dispersion effects caused by the transmission channel can be at least partially compensated, so an enlargement of the maximum range can be achieved due to this compensation. The quality of the compensation depends on how precisely the channel properties of the transmission channel are known. The more detailed the knowledge of the channel properties is, the better potential channel interference can be compensated. It is extremely important for a practical embodiment that the expenditure necessary when determining the channel properties and during subsequent compensation is still economically viable.

The running time and attenuation compensation of electrical transmission channels is a method that has been known and practiced for many decades, wherein different approaches have been or are used. It is therefore known, for example, to manually measure the transmission channel and then individually adjust compensation elements at the receiver or transmitter side. This approach is advantageous to the extent that very precise compensation is possible, but each transmission channel has to be individually adjusted so the expenditure is extraordinarily high. In accordance with a further approach, it is also known to select, from a set of predetermined standard parameters, a respectively suitable set of parameters for conduction compensation. In other words, compensation requires only low expenditure, although only incomplete adaptation between the sets of parameters available and the transmission channel is possible. It is also known to use digital signal processing methods for compensation, the received stream of data being analysed in the frequency range in order to be able to make conclusions about the channel properties, i.e. the physical transmission parameters of the transmission channel, from the observation of the energy distribution in the frequency range, for example. This procedure is connected with the advantage that it is very flexible and allows an adaptive compensation of potential attenuation and dispersion effects. A problem with this procedure is, however, that the transmission parameters of the transmission channel can only be indirectly assessed using heuristic methods.

The above-described approaches solve the problem of estimating parameters or parameter compensation more or less equally, it being common to all of these approaches that they are not capable of ascertaining the exact transmission channel parameters.

In principle, it would also be possible to subject the stream of data received from the receiver to a fast Fourier transformation (FF) to assess the physical channel properties of a transmission channel, in order to then calculate from the data sequence obtained therefrom the physical channel properties of the transmission channel using a fitting method. A fast Fourier transformation does not, however, have a linear order but where there is a sampling sequence of n values, the order $O(n \ln(n))$. To calculate the value sequence in the frequency range $k \times n \times \ln(n)$ elementary arithmetic operations are thus necessary, wherein the fitting method still has to be carried out following the fast Fourier transformation, and this requires a complex matrix inversion or a time consuming iterative method. On the basis of the non-linear order alone, a method of this type based on a fast Fourier transformation is not capable, at the highest possible sampling rate, of carrying out signal processing in real time without parallelisation measures. The degree of system complexity or calculation complexity is also extremely high.

SUMMARY

One embodiment of the present invention provides a method and a correspondingly configured device for estimating or determining physical channel properties of an electrical transmission channel, whereby the physical channel properties can be determined with a higher degree of accuracy than with previously known methods, wherein the invention is also to be simple to achieve and inexpensive to implement.

For estimating the physical channel properties of an electrical transmission channel, one embodiment of the present invention proposes sampling a signal received via the transmission channel and ascertaining from the sampled values resulting therefrom moments of the received signal, from which moments parameters of a transmission function of the transmission channel representing the channel properties are in turn determined.

The received signal can, in particular, be a system response, for example the pulse response or step response of the corresponding transmitter, in one case. It is also possible for the evaluated and received signal to be any desired linear combination of the pulse response or step response. The method presented herein can, in principle, also be extended to the ramp response or another system response obtained from the pulse response by integration or differentiation.

Determination of the above-described parameters of the transmission function, which can be represented as a broken rational function, of the respective electrical transmission channel can be achieved easily, wherein the parameters determined from the previously ascertained moments can be polynomial coefficients of a summation notation of the transmission function, which can be converted into zero points of a product notation of the transmission function or coefficients of a residual notation of the transmission function. In this case, in particular the first n moments of the received signal are ascertained from the obtained sampled values of the sampled received signals to determine n parameters of the transmission function. In particular, the n parameters of the broken rational transmission function of the n/2 degree of the transmission channel can be determined from the n moments of the received signal, determination of the parameters from the previously ascertained moments in one case being achieved by using a look-up table. Alternatively, a corresponding linear equation system can be solved.

Before ascertaining the moments of the received signal, the sampled values obtained by sampling the received signal are in one case quantisised and thus converted into a binary number notation. The individual sampled values are multiplied by different time values to ascertain the moments, the time values also existing in the form of a binary number notation. Overall, the moments can be ascertained in the form of a digital multiplication with subsequent summation in a completely digital manner, wherein the individual moments can be ascertained in a completely parallel manner on the basis of the same sampled values and with the same clock.

The assessment in accordance with one embodiment of the invention of the channel properties of the transmission channel is in one case carried out in a transmission system on the side of a receiver communicating with a corresponding transmitter during a learning phase before the start of the actual data transmission, wherein the channel assessment can be run through repeatedly during this learning phase in order to determine a new set of parameters for the transmission function on each run, so, from the various sets of parameters, an average set of parameters can subsequently be ascertained, which forms the definitive assessments of the transmission function or transmission channel. Regular data transmission can then be carried out on the basis of this average set of parameters following appropriate programming of an equaliser for compensation.

The present invention is suitable for assessing the channel properties of a wired transmission channel for high-speed interfaces of communications devices, such as a hub for example. The invention obviously is not limited to this field of application, however, and can also be used generally for assessing the channel properties of a wireless transmission channel.

Using the present invention, determining or assessing the physical channel properties or channel parameters of an electrical transmission channel is possible with a high degree of accuracy. The invention may, moreover, be easily achieved and implemented at low cost. The invention also makes it possible for the first time to extract the system parameters in a closed form from a pulse response or step response of a linear transmission system. One embodiment of the invention is based on a signal-theoretical approach which may be mapped on microelectronic systems.

If the transmission system or the corresponding transmission channel may be described by a broken rational function, and this is the case for all RLCGU systems, for example, then the system parameters, that is, the parameters of the transmission function that represent the physical channel properties, such as the attenuation and dispersion characteristics, of the transmission channel can be obtained from the step response or pulse response of the transmission system. If the corresponding transmission system cannot be described by a broken rational function, as is the case for a conductor for example, then the transmission system can be approximated as accurately as desired by a broken rational function. In any case, the method proposed in accordance with one embodiment of the invention is of linear order 0(n) and if the pulse response or step response exists as a sampling sequence of n values only k×n elementary arithmetic operations are required to calculate the parameters of the transmission function.

One embodiment of the present invention is therefore based on a signal-theoretical basis which, in principle, allows an assessment of the transmission channel parameters as accurately as desired. Deviations from the exact values result exclusively owing to the limits of a practical implementation, namely owing to the accuracy of the internal number notation and the signal sampling rate, and this can be regarded as implementation-dependent quantisation noise. As a result of the fact that the method proposed in accordance with one embodiment of the invention is of linear order, the invention makes digital signal processing in real time possible at the highest possible sampling rate, without a parallelisation being necessary. The higher the sampling rate can be selected, the higher the resolution in terms of time and the higher the accuracy of the parameters obtained are. As only very simple arithmetic operations have to be carried out, implementation of the present invention is possible with an extremely simple architecture.

BRIEF DESCRIPTION OF THE DRAWING

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 3 illustrates an example of a broken rational transmission function, of which the polynomial coefficients can be determined in accordance with the invention using matrix equations likewise illustrated in FIG. 3.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
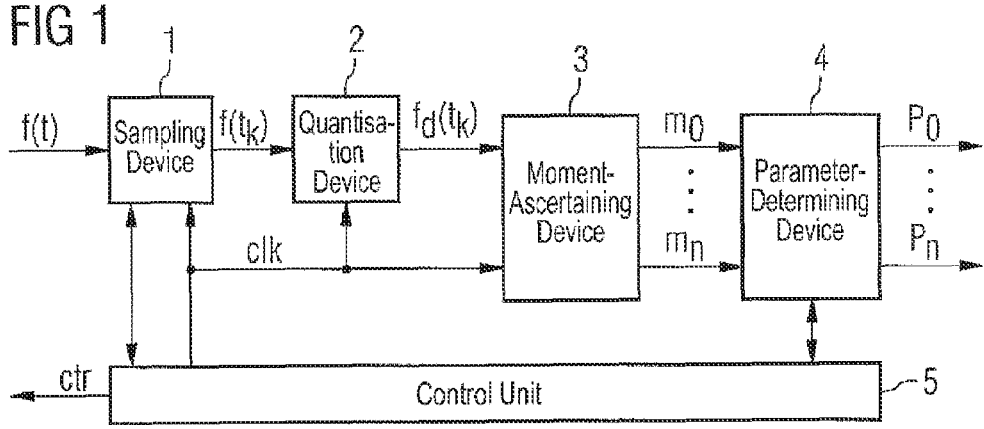
FIG. 1 illustrates a simplified block diagram of a device for estimating the physical channel properties of an electrical transmission channel in accordance with the present invention.

FIG. 1 illustrates a simplified block diagram of a device for assessing the physical channel properties of an electrical transmission channel or a wireless or wired transmission system. The device illustrated in FIG. 1 can be produced, for example, on the side of a receiver which communicates with a corresponding transmitter of the transmission system. The device illustrated in FIG. 1 comprises a control unit 5 which controls the sequence of the channel assessment, on the one hand, and communicates via control signals ctr with the corresponding transmitter, on the other hand. The principle mode of operation of the control unit 5, or of the device illustrated in FIG. 1, for channel assessment is described now.

Before the start of actual data transmission, a learning phase begins in which the channel properties of the transmission channel are determined or assessed. The receiver switches into a learning mode in order to perform this learning phase and transmits a start learning mode signal to the transmitter.

The transmitter then sends a 0-1 step to the receiver and, with the aid of a sampling device 1, the receiver samples the step response until it has assumed its stationary value. The sampled values of the sampling device 1 are quantisised by a quantisation device 2 and thus converted into quantisised binary values. The stationary end value of the step response is therefore stored in the form of a quantisised binary value.

The receiver then sends a further start learning mode signal to the transmitter, so the transmitter then transmits a 0 sequence to the receiver, whereupon the receiver, again with the aid of the sampling device 1, samples the corresponding step response until it has assumed its stationary end value.

A further start learning mode signal is then sent from the receiver, or from the control unit 5, to the transmitter, whereupon the transmitter transmits a 0-1 step to the receiver, which is to be used as the basis for the assessment of the channel properties of the corresponding transmission channel. After a pre-adjusted delay, corresponding to double the assessed delay time of the transmission channel, the receiver begins to sample the step response of the received signal f (t) with the aid of the sampling device 1, whereupon sampled values $f(t_k)$ are obtained, $t_k$ designating the sampling instants of the sampling device 1. The sampled values of the sampling device 1 are, in turn, fed to the quantisation device 2, which can comprise an analog-to-digital converter, in order to quantisise the sampled values and convert them into a binary number notation $f_d(t_k)$ The digitised stream of data $f_d(t_k)$ thus obtained is fed to a device for determining the moments of the received signal or the received step response f (t), the digitised stream of data being distributed among n+1 simultaneously operated processing units, which will be described in more detail hereinafter, to determine the n+1 first moment, the processing units calculating from the digitised stream of data $f_d(t_k)$ fed to them the n+1 first moments $m_0 \ldots m_n$ of the received step response f (t).

As can be seen from FIG. 1 the moments of the moment-ascertaining device 3 are fed to a conversion or parameter-determining device 4, which converts the moments $m_0 \ldots m_n$ into n+1 parameters of a broken rational function, in particular into polynomial coefficients of a broken rational function of the n/2 degree. The parameter-determining device 4 can be implemented in the simplest case by a look-up table. The parameters $P_0 \ldots P_n$ generated by the parameter-determining device 4 determine the transmission function of the transmission channel. Thus, in principle, the transmission function of the transmission channel, which represents the physical properties of the transmission channel, is obtained as an output from the parameter-determining device 4, with the aid of which function the physical properties, such as the attenuation and dispersion properties, in particular, of the transmission channel can be assessed or determined.

As soon as the step response f (t) obtained from the receiver has attained its stationary value, the moments $m_0 \ldots m_n$ do not change anymore. The above-described learning phase can then be repeatedly run through in order to calculate a new set of parameters $P_0 \ldots P_n$ after each run, so, from all sets of parameters, an average set of parameters can then be formed which forms the definitive assessments of the transmission channel, that is, the definitive parameter values for the transmission function of the transmission channel. Once the above-described learning mode has finished the receiver can send an end learning mode signal to the transmitter, so regular data transmission can then take place, optionally with compensation of the attenuation and dispersion effects caused by the transmission channel, on the basis of the previously assessed physical channel properties, that is, on the basis of the ascertained transmission function, of the transmission channel.

Since the mode of operation of the device, illustrated in FIG. 1, for assessing the physical channel properties of the transmission channel has basically previously been described, ascertaining the individual moments via the moment-ascertaining device 3 and determining the individual parameters of the transmission function via the parameter-determining device 4 shall be discussed in more detail hereinafter. It will be assumed hereinafter that the process for determining the moments and for determining the parameters of the transmission function will start at an instant t=0 with the evaluation of the signal f (t) received via the transmission channel.

As described, this analog signal f (t) is sampled by the sampling device 1 at periodic intervals Δt, the sampling rate being determined by a clock clk illustrated in FIG. 1, wherein asynchronous sampling is also possible with variable Δt. The discrete sequence of sampled values or pulses $f(t_k)$, obtained from the sampled signal f (t), as has also already been described, is fed to the quantisation device 2 to carry out a discretisation and quantisation, the quantisation device 2 also being operated with a clock clk. The quantisation device 2 therefore outputs the discrete binary signal sequence $f_d(t_k)$ which represents the individual amplitude values of the sampled values as binary numbers.

The moments $m_0 \ldots m_n$ are calculated on the basis of the above-described discrete binary signal sequence $f_d(t_k)$. Here, a moment of the ith order (i=0 . . . n) is generally defined by the following mathematical equation:

$$m_i = \frac{1}{i!} \int_{t=0}^{\infty} t^i \cdot f(t) \, dt \qquad (1)$$

In a digital, signal-processed system the function f (t) in formula (1) represents, as described, the received electrical signal, of which the amplitude values are present as discrete binary signal sequences, the parameter t corresponding in formula (1) to time, while the parameter i indicates the order of moment. The integral in accordance with formula (1) therefore changes into a sum and the moment of the ith order of the received signal f (t) can be calculated as follows:

$$m_i = \frac{1}{i!} \sum_{k=0}^{\infty} t_k^i \cdot f(t_k) \cdot \Delta t \quad (2)$$

Here, $\Delta t$ designates the sampling interval of the sampling device 1 and $t_k$ designates the sampling instants. For the sake of completeness reference is also made to the fact that i! designates the thus named factorial of i where i!=1×2×3× . . . ×i, and that in a real circuit formula (2) is actually only calculated with a finite number of N sampled values.

It can be seen from formula (2) that each moment can, in principle, be determined by multiplication and summation processes. The moment-ascertaining device 3 illustrated in FIG. 1 can accordingly be constructed from processing units or moment formers 6, as illustrated in FIG. 2, for each moment.

Figure 2:
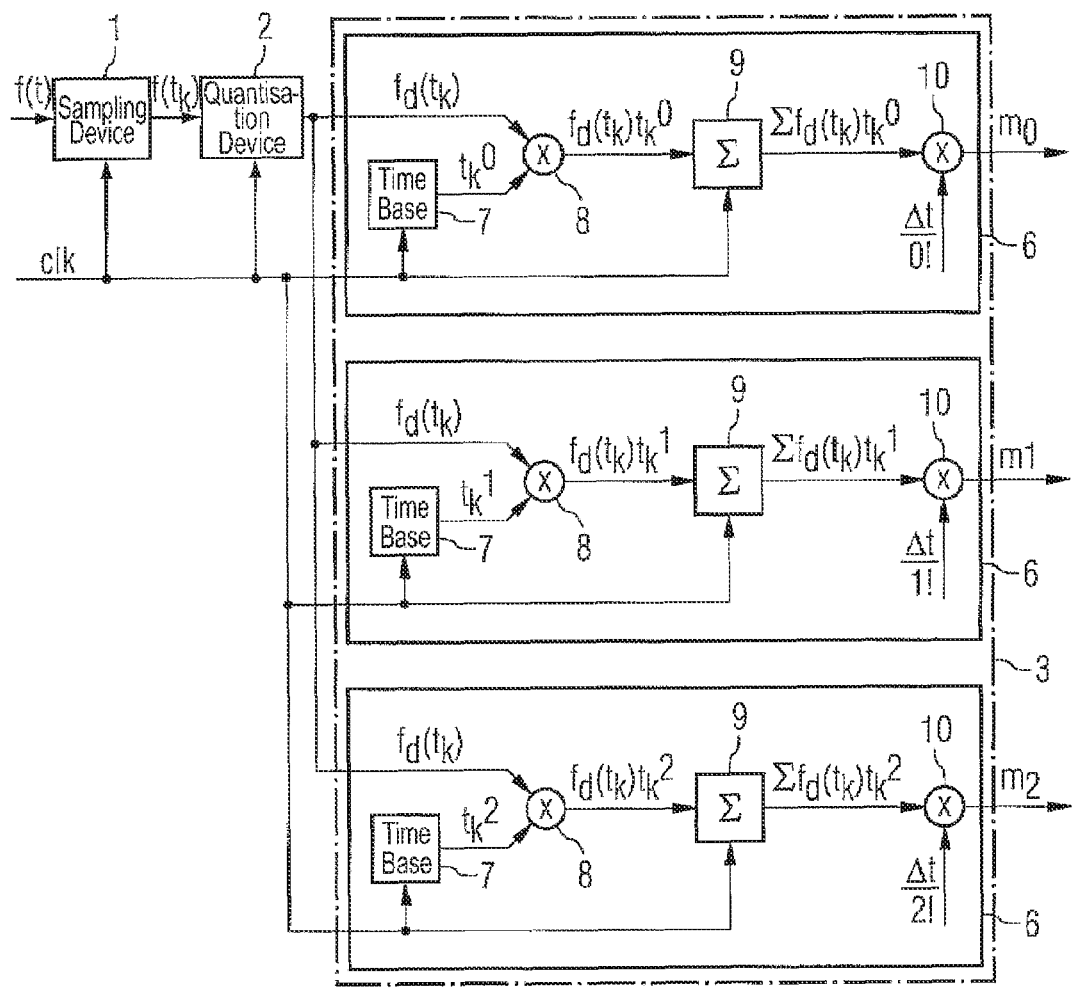
FIG. 2 illustrates a detailed block diagram of a moment-ascertaining device illustrated in FIG. 1.

It can be seen from FIG. 2 that each processing unit 6 receives the discrete binary signal sequence $f_d(t_k)$ from the quantisation unit 2. The common clock signal clk is also fed to each processing unit 6. Each processing unit 6 comprises a time base 7 which, as a function of the clock signal clk, generates the time value $t^i_k$ (i=0 . . . n) to calculate the respective moment, which value is fed as a binary number to a digital multiplier 8 where the corresponding time value is multiplied by the discrete binary signal sequence $f_d(t_k)$. The result of this multiplication also exists as a binary notation, the results of the individually multiplications being added by a summing element 9. The respectively obtained sum value is fed to a further digital multiplier 10 and multiplied by the value ($\Delta t$/i!), so the desired moment $m_i$ is output by the multiplier 10 in agreement with formula (2).

FIG. 2 illustrates the generation of the moments $m_0$, $m_1$ and $m_2$ merely by way of example. It is of course also possible to ascertain a larger (or a smaller) number of moments in the moment-ascertaining device 3 from the discrete binary signal sequence $f_d(t_k)$. Furthermore, the integral equation in accordance with formula (1) was converted into a discrete summation in the individual processing units 6 according to FIG. 2, in agreement with formula (2), wherein a numerical integration with a higher degree of accuracy, for example corresponding to the trapezoidal rule according to Simpson, etc. can be used instead of a simple summation.

The first n+1 moments $m_0$, $m_1$, . . . , $m_n$ of the received signal f(t) must be determined (n=0,1,2,3 . . . ) to describe the transmission channel with n+1 parameters.

It can be seen from FIG. 2 that the discrete binary signal sequence $f_d(t_k)$ generated by the quantization device 2 and the clock signal clk are all fed to processing units 6 simultaneously, so the processing units 6 can determine the individual moments completely simultaneously. The processing units 6 basically have an identical structure but produce different powers of the sampling instants $t_k$ with their time bases 7. Different multiplication values are also fed to the digital multipliers 10 at the output of the individual summing elements 9, as a function of the determination of the respectively desired moment.

It is possible to determine from the moments $m_0$, $m_1$ . . . $m_n$ ascertained as described above n+1 parameters of the transmission channel, it being possible to represent the transmission channel approximately or exactly, as described, by a broken rational function, as illustrated above in FIG. 3, H(p) designating the transmission function of the transmission channel and $a_i$, and $b_i$ (i=0 . . . n) the polynomial coefficients of the transmission channel.

The connection between the moments and the polynomial coefficient is given by the matrix equations likewise illustrated in FIG. 3, the equation shown at the bottom of FIG. 3 applying between the moments $m_i$ and the 'wavy' values in the matrices.

The matrix equations of FIG. 3 tend to be used less for a concrete embodiment, instead the solution thereof is used. As this is merely a linear combination of the ascertained moments in this case, the conversion can be implemented, for example, in the form of a look-up table, so, in principle, the parameter-determining device 4 illustrated in FIG. 1 can determine the polynomial coefficients of the transmission function of the transmission channel from the ascertained moments by simply accessing the memory.

The physical channel properties, such as the dispersion and attenuation properties, in particular, can be described exactly, or at least approximately, using the transmission function thus determined.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for estimating channel properties of a transmission channel, comprising:

sampling a signal received via the transmission channel to obtain corresponding sampled values;

ascertaining a plurality of moments of the received signal from the sampled values;

determining parameters of a transmission function of the transmission channel from the plurality of moments; and ascertaining the channel properties of the transmission channel with the aid of the transmission function, wherein the transmission function H(p) of the transmission channel has the form $$H(p) = \frac{a_0 + a_1 p + a_2 p^2 + a_3 p^3 + \ldots + a_n p^n}{b_0 + b_1 p + b_2 p^2 + b_3 p^3 + \ldots + b_n p^n}, \text{ and}$$

in that the coefficients $a_i$ and $b_i$ are determined from the moments $m_i$ ascertained, where i=0,1 . . . n, in accordance with the following equations:

$$\begin{pmatrix} b_1 \\ b_2 \\ \vdots \\ b_{n-2} \\ b_{n-1} \\ b_n \end{pmatrix} = - \begin{pmatrix} \tilde{m}_n & \tilde{m}_{n-1} & \cdots & \tilde{m}_3 & \tilde{m}_2 & \tilde{m}_1 \\ \tilde{m}_{n+1} & \tilde{m}_n & \cdots & \tilde{m}_4 & \tilde{m}_3 & \tilde{m}_2 \\ \tilde{m}_{n+2} & \tilde{m}_{n+1} & \cdots & \tilde{m}_5 & \tilde{m}_4 & \tilde{m}_3 \\ & & & & & \\ \tilde{m}_{2n-3} & \tilde{m}_{2n-4} & \cdots & \tilde{m}_n & \tilde{m}_{n-1} & \tilde{m}_{n-2} \\ \tilde{m}_{2n-2} & \tilde{m}_{2n-3} & \cdots & \tilde{m}_{n+1} & \tilde{m}_n & \tilde{m}_{n-1} \\ \tilde{m}_{2n-1} & \tilde{m}_{2n-2} & \cdots & \tilde{m}_{n+2} & \tilde{m}_{n+1} & \tilde{m}_n \end{pmatrix}^{-1} \begin{pmatrix} \tilde{m}_{n+1} \\ \tilde{m}_{n+2} \\ \tilde{m}_{n+3} \\ \vdots \\ \tilde{m}_{2n-2} \\ \tilde{m}_{2n-1} \\ \tilde{m}_{2n} \end{pmatrix}$$

and

-continued $$\begin{pmatrix} a_0 \\ a_1 \\ a_2 \\ \vdots \\ a_{n-2} \\ a_{n-1} \\ a_n \end{pmatrix} = \begin{pmatrix} 0 & 0 & \cdots & 0 & 0 & 0 \\ \tilde{m}_0 & 0 & \cdots & 0 & 0 & 0 \\ \tilde{m}_1 & \tilde{m}_0 & \cdots & 0 & 0 & 0 \\ & & \ddots & & & \\ \tilde{m}_{n-3} & \tilde{m}_{n-4} & \cdots & \tilde{m}_0 & 0 & 0 \\ \tilde{m}_{n-2} & \tilde{m}_{n-3} & \cdots & \tilde{m}_1 & \tilde{m}_0 & 0 \\ \tilde{m}_{n-1} & \tilde{m}_{n-2} & \cdots & \tilde{m}_2 & \tilde{m}_1 & \tilde{m}_0 \end{pmatrix} \begin{pmatrix} b_1 \\ b_2 \\ \vdots \\ b_{n-2} \\ b_{n-1} \\ b_n \end{pmatrix} + \begin{pmatrix} \tilde{m}_0 \\ \tilde{m}_1 \\ \tilde{m}_2 \\ \vdots \\ \tilde{m}_{n-2} \\ \tilde{m}_{n-1} \\ \tilde{m}_n \end{pmatrix},$$

wherein $$\tilde{m}_i = (-1)^i m_i,$$

applies.

2. The method of claim 1, wherein the sampled signal that is received via the transmission channel is a system response of a transmission system.

3. The method of claim 2, wherein the system response is a pulse response of the transmission system.

4. The method of claim 2, wherein the system response is a step response of the transmission system.

5. The method of claim 1, wherein the received signal is a linear combination of various system responses of a transmission system.

6. The method of claim 1, wherein the parameters of the transmission function are selected from a group comprising polynomial coefficients, zero points and coefficients of a residual notation of the transmission function.

7. The method of claim 1, wherein to determine n+1 parameters of the transmission function, the moments of the order 0,1 . . . n of the received signal are ascertained.

8. The method of claim 1, wherein the parameters of a broken rational function are determined from the moments as the transmission function of the transmission channel.

9. The method of claim 7, wherein the transmission function is a broken rational function of the n/2 degree.

10. The method of claim 1, wherein the parameters of the transmission function of the transmission channel are determined from the moments by using a look-up table.

11. The method of claim 1, wherein the sampled values of the received signal are quantisised to ascertain the moments.

12. A method of estimating channel properties of a transmission channel, comprising:

sampling a signal received via the transmission channel to obtain corresponding sampled values;

ascertaining a plurality of moments of the received signal from the sampled values;

determining parameters of a transmission function of the transmission channel from the plurality of moments; and ascertaining the channel properties of the transmission channel with the aid of the transmission function, wherein in moments of the order 0 . . . n are ascertained from the sampled values of the received signal in accordance with the following equation:

$$m_i = \frac{1}{i!} \sum_{k=0}^{N} t_k^i \cdot f(t_k) \cdot \Delta t,$$

wherein $m_i$ designates the moment of the order i, $t_k$ a sampling instant, $\Delta t$ a sampling interval and N a number of sampled values.

13. A method of estimating channel properties of a transmission channel, comprising:

sampling a signal received via the transmission channel to obtain corresponding sampled values;

ascertaining a plurality of moments of the received signal from the sampled values;

determining parameters of a transmission function of the transmission channel from the plurality of moments: and ascertaining the channel properties of the transmission channel with the aid of the transmission function, wherein sampling the signal, ascertaining the plurality of moments, and determining parameters are repeated to determine a new set of parameters for the transmission function of the transmission channel with each repetition, wherein from the various sets of parameters, an average set of parameters is ascertained to assess the transmission function of the transmission channel as a basis for the ascertaining the channel properties of the transmission channel with the aid of the transmission function.

14. The method of claim 1, wherein the method is used for estimating channel properties of a wired transmission channel in a communications device.

15. A device configured to estimate channel properties of a transmission channel, comprising:

a sampling device configured to sample a signal received via the transmission channel to obtain corresponding sampled values;

a moment-ascertaining device configured to ascertain a plurality of moments of the received signal from the sampled values; and a parameter-determining device configured to determine parameters of a transmission function of the transmission channel from the moments ascertained to ascertain the channel properties of the transmission channel on the basis of the thus determined transmission function, wherein the transmission function H(p) of the transmission channel has the form $$H(p) = \frac{a_0 + a_1 p + a_2 p^2 + a_3 p^3 + \ldots + a_n p^n}{b_0 + b_1 p + b_2 p^2 + b_3 p^3 + \ldots + b_n p^n}, \text{ and}$$

in that the coefficients $a_i$ and $b_i$ are determined from the moments $m_i$ ascertained, where i=0,1 . . . n, in accordance with the following equations:

$$\begin{pmatrix} b_1 \\ b_2 \\ \vdots \\ b_{n-2} \\ b_{n-1} \\ b_n \end{pmatrix} = - \begin{pmatrix} \tilde{m}_n & \tilde{m}_{n-1} & \cdots & \tilde{m}_3 & \tilde{m}_2 & \tilde{m}_1 \\ \tilde{m}_{n+1} & \tilde{m}_n & \cdots & \tilde{m}_4 & \tilde{m}_3 & \tilde{m}_2 \\ \tilde{m}_{n+2} & \tilde{m}_{n+1} & \cdots & \tilde{m}_5 & \tilde{m}_4 & \tilde{m}_3 \\ & & & & & \\ \tilde{m}_{2n-3} & \tilde{m}_{2n-4} & \cdots & \tilde{m}_n & \tilde{m}_{n-1} & \tilde{m}_{n-2} \\ \tilde{m}_{2n-2} & \tilde{m}_{2n-3} & \cdots & \tilde{m}_{n+1} & \tilde{m}_n & \tilde{m}_{n-1} \\ \tilde{m}_{2n-1} & \tilde{m}_{2n-2} & \cdots & \tilde{m}_{n+2} & \tilde{m}_{n+1} & \tilde{m}_n \end{pmatrix}^{-1} \begin{pmatrix} \tilde{m}_{n+1} \\ \tilde{m}_{n+2} \\ \tilde{m}_{n+3} \\ \vdots \\ \tilde{m}_{2n-2} \\ \tilde{m}_{2n-1} \\ \tilde{m}_{2n} \end{pmatrix}$$

and

-continued $$\begin{pmatrix} a_0 \\ a_1 \\ a_2 \\ \vdots \\ a_{n-2} \\ a_{n-1} \\ a_n \end{pmatrix} = \begin{pmatrix} 0 & 0 & \cdots & 0 & 0 & 0 \\ \tilde{m}_0 & 0 & \cdots & 0 & 0 & 0 \\ \tilde{m}_1 & \tilde{m}_0 & \cdots & 0 & 0 & 0 \\ & & \ddots & & & \\ \tilde{m}_{n-3} & \tilde{m}_{n-4} & \cdots & \tilde{m}_0 & 0 & 0 \\ \tilde{m}_{n-2} & \tilde{m}_{n-3} & \cdots & \tilde{m}_1 & \tilde{m}_0 & 0 \\ \tilde{m}_{n-1} & \tilde{m}_{n-2} & \cdots & \tilde{m}_2 & \tilde{m}_1 & \tilde{m}_0 \end{pmatrix} \begin{pmatrix} b_1 \\ b_2 \\ \vdots \\ b_{n-2} \\ b_{n-1} \\ b_n \end{pmatrix} + \begin{pmatrix} \tilde{m}_0 \\ \tilde{m}_1 \\ \tilde{m}_2 \\ \vdots \\ \tilde{m}_{n-2} \\ \tilde{m}_{n-1} \\ \tilde{m}_n \end{pmatrix},$$

wherein $\tilde{m}_i = (-1)^i m_i$, applies.

16. The device of claim 15, wherein a quantisation device configured for quantisising the sampled values of the sampling device is arranged between the sampling device and the moment-ascertaining device.

17. A device configured to estimate channel properties of a transmission channel, comprising:
a sampling device configured to sample a signal received via the transmission channel to obtain corresponding sampled values;
a moment-ascertaining device configured to ascertain a plurality of moments of the received signal from the sampled values; and
a parameter-determining device configured to determine parameters of a transmission function of the transmission channel from the moments ascertained to ascertain the channel properties of the transmission channel on the basis of the thus determined transmission function wherein the moment-ascertaining device comprises a plurality of processing units for ascertaining the moments, each processing unit being provided and configured for ascertaining one of the moments, wherein the moment-ascertaining device is configured for ascertaining the moments $m_0, m_i \ldots m_n$, $m_i$, where $i=0 \ldots n$, designating the moment of the order i of the received signal, and wherein the processing unit, for ascertaining the moment $m_i$, comprises a time base for generating a time value $t^i_k$, a multiplier for multiplying the time value $t^i_k$ by the sampled values, present in digital form, of the sampling device, a summing element for adding up an output signal of the multiplier and a further multiplier for multiplying an output signal of the summing element by the value $(\Delta t/i!)$, where $t_k$ designates a sampling instant and $\Delta t$ a sampling interval.

18. The device of claim 17, wherein the sampled values of the sampling device are fed to all processing units of the moment-ascertaining device simultaneously and in digital form.

19. The device of claim 17, wherein a common clock signal is fed to all processing units of the moment-ascertaining device.

20. A device configured to estimate channel properties of a transmission channel, comprising:
a sampling device configured to sample a signal received via the transmission channel to obtain corresponding sampled values;
a moment-ascertaining device configured to ascertain a plurality of moments of the received signal from the sampled values; and
a parameter-determining device configured to determine parameters of a transmission function of the transmission channel from the moments ascertained to ascertain the channel properties of the transmission channel on the basis of the thus determined transmission function, wherein sampling the signal, ascertaining the plurality of moments, and determining parameters are repeated to determine a new set of parameters for the transmission function of the transmission channel with each repetition, wherein from the various sets of parameters, an average set of parameters is ascertained to assess the transmission function of the transmission channel as a basis for the ascertaining the channel properties of the transmission channel with the aid of the transmission function.

* * * * *